April 30, 1957 R. J. KUTZLER 2,790,303
JET ENGINE FUEL AND NOZZLE AREA CONTROL APPARATUS
Filed Jan. 28, 1950 3 Sheets-Sheet 1

FIG. 1

INVENTOR.
ROBERT J. KUTZLER
BY George H. Fisher
ATTORNEY

April 30, 1957  R. J. KUTZLER  2,790,303
JET ENGINE FUEL AND NOZZLE AREA CONTROL APPARATUS
Filed Jan. 28, 1950  3 Sheets-Sheet 2

Fig. 2

INVENTOR.
ROBERT J. KUTZLER
BY George H Fisher
ATTORNEY

April 30, 1957  R. J. KUTZLER  2,790,303
JET ENGINE FUEL AND NOZZLE AREA CONTROL APPARATUS
Filed Jan. 28, 1950  3 Sheets-Sheet 3

_Fig. 3_

_Fig. 4_

_Fig. 5_

_Fig. 6_

Inventor
ROBERT J. KUTZLER
By George A. Fisher
Attorney

United States Patent Office 2,790,303
Patented Apr. 30, 1957

2,790,303

JET ENGINE FUEL AND NOZZLE AREA CONTROL APPARATUS

Robert J. Kutzler, Minneapolis, Minn., assignor to Minneapolis-Honeywell Regulator Company, Minneapolis, Minn., a corporation of Delaware Application January 28, 1950, Serial No. 141,029

23 Claims. (Cl. 60—35.6)

The present invention is concerned with an automatic control apparatus for regulating the operation of a combustion engine. More particularly, the present apparatus is for use with a combustion engine where engine speed and temperature are prime factors in determining the power output from the engine.

In present day combustion engines, particularly engines used with high speed aircraft, such as jet engines, the temperatures within the engine and the speed of rotation of the engine may be regulated to control the power from the engine. The temperature and speed of rotation may be controlled by regulating the fuel flow to the engine and by varying the area of the outlet through which the products of combustion pass, such as by a tail cone movable in the outlet of the engine. Since these engines may be used in high speed aircraft, the controls therefor must be fast and accurate and flexible and must not be a weight burden on the aircraft carrying the same. It is therefore an object of the present invention to provide a new and improved type of automatic control apparatus.

Another object of the invention is to provide a new and improved combustion engine control in which the engine temperature controls the area of the outlet of the engine.

Another object of the invention is to provide a new and improved combustion engine control in which the engine temperature controls the amount of fuel flow to the engine.

Another object of the invention is to provide a new and improved combustion engine control in which the engine speed of rotation controls the amount of fuel flow to the engine.

Another object of the invention is to provide a new and improved combustion engine control in which the engine speed of rotation controls the area of the outlet of the engine.

A further object of the invention is to provide a new and improved combustion engine control in which both the engine temperature and the engine speed of rotation control the amount of fuel flow to the engine.

Still another object of the invention is to provide an adjustable electrical resistance network in a combustion engine control to effect a non-linear engine temperature change or engine speed change with a linear change in position of a manual control point selector.

Another object of the invention is to provide a new and improved electrical control circuit to regulate the operation of a combustion engine.

A further object of the invention is to provide a new and improved electrical control circuit to regulate the temperature of a combustion engine and hold it to a desired value.

A further object of the invention is to provide a new and improved electrical control circuit to regulate the fuel flow to a combustion engine and hold the flow to a desired value.

These and other objects of the invention will be understood upon considering the following specification and the appended drawings of which.

Figure 1:
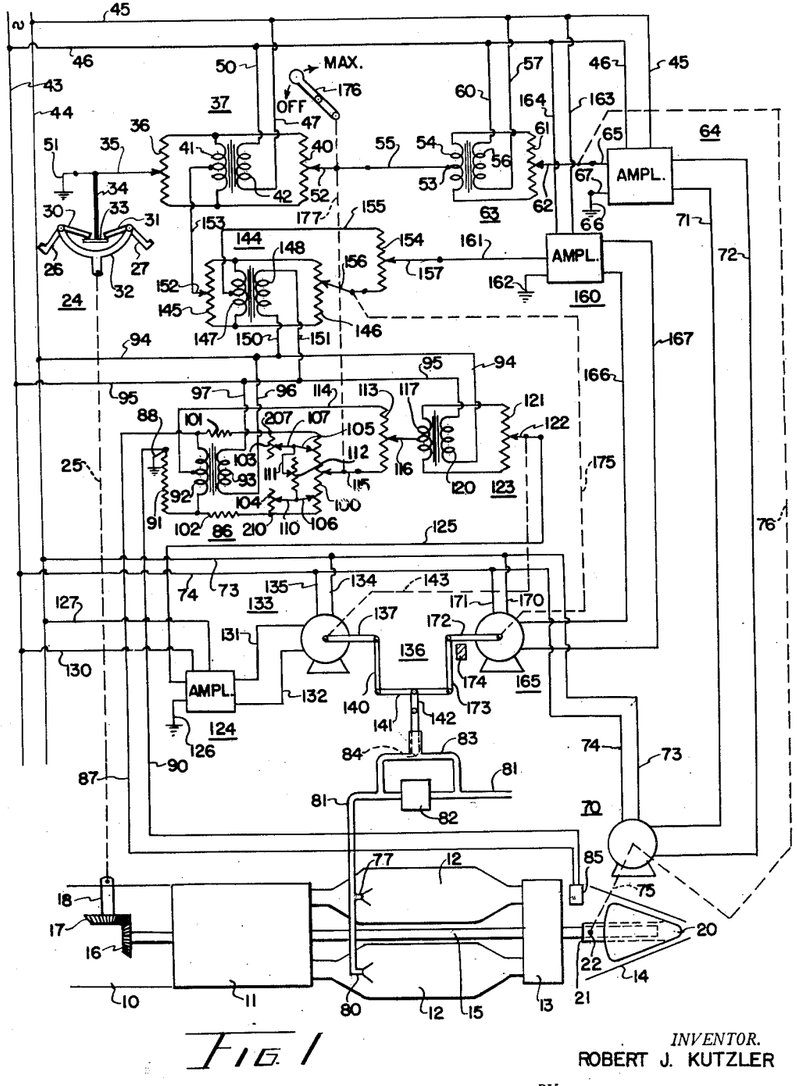
Figure 1 is a schematic drawing showing one form of the invention as applied to a combustion engine having an adjustable tail cone.

*Description of circuit in Figure 1*

Referring now to Figure 1 there is shown a schematic drawing of a jet engine which has an inlet duct 10, a compressor 11, a combustion chamber 12, a turbine 13 and an exhaust outlet 14. A drive shaft 15, driven by the turbine 13, runs through the center of the engine and drives the compressor 11. At the forward end of this shaft 15 is a beveled gear 16 which is in operative engagement with a second gear 17 on a shaft 18. At the opposite end of the shaft 15 is a cone 20 on a sleeve 21. The sleeve 21 rides over the shaft 15 and is held in the desired position on the shaft by mechanical connection 75 from motor 70 to pin 22 on the sleeve. It is to be understood, of course, that this is merely a schematic drawing and that in actual practice entirely different means may be used to attach the movable tail cone in the jet engine.

The shaft 18, which is driven by the shaft 15, is mechanically connected to a governor 24 through a mechanical linkage designated by the numeral 25. This governor 24 is shown to comprise a pair of weights or fly balls 26 and 27 rigidly conected to a pair of arms 30 and 31. The arms 30 and 31 are joined to a yoke 32 which is rotated by the mechanical connection 25. The fly balls 26 and 27 move upwardly with increased speed of rotation of disk 32 to cause arms 30 and 31 to move a disk 33 downwardly. Disk 33 is connected by a shaft 34 to a wiper arm 35 which moves in operative relation to a resistor 36. The resistor 36 is a part of the main control network which effects positioning of the tail cone 20.

The main control network for the tail cone 20 comprises in part the resistor 36 and a further resistor 40, both of which are connected across a transformer secondary 41. Energizing the secondary is a primary 42 connected to a convenient source of voltage, shown in the figure as line voltage conductors 43 and 44, by the following circuit: from line voltage conductor 43 through conductors 46 and 50, transformer primary 42, and conductors 47 and 45 to line voltage conductor 44. The wiper arm 35 on resistor 36 is connected to ground terminal 51. Resistor 40 has a wiper arm 52 movable along its length by a manual control point selector 176. The resistors 36 and 40, with their wiper arms, form a control network 37.

Wiper arm 52 is connected to a center tap 53 of a transformer secondary 54 through a conductor 55. Transformer secondary 54 is energized by a primary 56 shown in the figure to be connected to line voltage conductors 43 and 44 by the following circuit: from line voltage conductor 43 through conductors 46 and 60, transformer primary 56, and conductors 57 and 45 to line voltage conductor 44. Transformer secondary 54 has a resistor 61 connected across its terminals. A follow up wiper arm 62 moves along the resistor 61. The combination of resistor 61 and transformer secondary 54 may be considered to form a follow up network 63.

Wiper arm 62, moving along resistor 61, is connected to an amplifier 64 through conductor 65. Conductor 65 forms one of the input conductors to the amplifier with the other input conductor 67 connected to a ground terminal 66. It will be noted that the input to amplifier 64 is controlled by network 37 and follow up network 63. The completed input circuit to the amplifier 64 extends from ground terminal 51 through wiper arm 35, network 37, wiper arm 52, conductor 55, follow up network 63, wiper arm 62, and conductor 65 to the amplifier and back to ground terminal 66.

The power supply for amplifier 64 is taken from line voltage conductors 43 and 44 by the following circuit: from line voltage conductor 43 through conductor 46, amplifier 64 and conductor 45 back to line voltage conductor 44. An example of an amplifier which may be used is that shown and described in the Upton patent, No. 2,446,563, entitled "Motor Systems With Voltage Limiting Feedback".

Amplifier 64 is connected to a motor 70 through conductors 71 and 72 to cause reverse operation of the motor 70. Motor 70 may be a two-phase induction motor having an amplifier winding and a power winding such as are commonly known in the art. The power winding of motor 70 is energized from line voltage conductors 43 and 44 by the following circuit: from line voltage conductor 43 through conductor 74, motor 70, and conductor 73 to line voltage conductor 44.

Motor 70 is mechanically connected to sleeve 21 through a mechanical connection 75 and moves the tail cone 20 along the shaft 15 to increase or decrease the effective exhaust area of the jet engine in response to the speed of rotation of the turbine 13. Motor 70 is also mechanically connected to the follow up wiper arm 62 on resistor 61 of follow up network 63 through a mechanical connection 76.

In the combustion chamber 12 a pair of fuel nozzles 77 and 80 are shown. These nozzles are connected to a fuel line 81 coming from a source of fuel, not shown. A pump 82 having a by-pass line 83 is inserted in the fuel line 81. The by-pass line 83 has a restriction 84 which is moved in response to a controlling condition.

A temperature sensing device 85 is shown in the exhaust outlet 14 to indicate the temperature of the burning gases at the turbine blades. The temperature sensing device 85 is connected to a network 86 through conductors 87 and 90, where it is inserted in series with a resistor 91. The junction between temperature sensing element 85 and resistor 91 is electrically connected to a ground terminal 88. The network 86 is energized by transformer secondary 92, the latter of which is energized by a primary 93 connected to the line voltage conductors 43 and 44 by the following circuit: from line voltage conductor 43 through conductors 95 and 97, transformer primary 93, and conductors 96 and 94 to line voltage conductor 44.

Also connected across the terminals of transformer secondary 92 is a resistor 100 in series with a pair of current limiting resistors 101 and 102. A resistor 103 is electrically connected to one terminal of resistor 100 while another resistor 104 is electrically connected to the opposite terminal of resistor 100. Resistor 100 has a pair of wiper arms 105 and 106 moving thereacross. Resistor 103 has a wiper arm 107 moving in cooperation therewith while resistor 104 has a wiper arm 110 moving thereacross. Wiper arms 105 and 107 moving across resistors 100 and 103 respectively are connected together and are further connected to a wiper arm 111 moving across a resistor 112. One terminal of resistor 112 is connected to wiper arms 106 and 110 moving along resistors 100 and 104 respectively, said wiper arms being connected together.

A center tap of transformer secondary 92, energizing network 86, is connected to one terminal of an authority resistor 113 through a conductor 114. The opposite terminal of resistor 113 is connected to a control point selector wiper arm 115 also movable over resistor 100, when adjusted by the control lever 176, acting through suitable coupling means 177.

Resistor 113 has a wiper arm 116 moving thereacross. Wiper arm 116 is connected to a center tap of a transformer secondary 117. The latter is energized by a primary 120 connected to line voltage conductors 43 and 44 by the following circuit: from line voltage conductor 43 through conductor 95, transformer primary 120, and conductor 94 to line voltage conductor 44. A follow up resistor 121 is connected across the terminals of transformer secondary 117. A wiper arm 122 is moved across resistor 121. The combination of resistor 121 with transformer secondary 117 form a follow up network 123.

The wiper arm 122 is connected to an amplifier 124 through conductor 125 to provide a signal input to the amplifier. The second input terminal of amplifier 124 is connected to ground terminal 126. It is thus seen that a signal to amplifier 124 passes through network 86 and follow up network 123, through conductor 125 to the amplifier and back to ground terminals 126 and 88 to network 86. Amplifier 124 is energized from line voltage conductors 43 and 44 by the following circuit: from line voltage conductor 43 through conductor 130, amplifier 124, and conductor 127 to line voltage conductor 44. The amplifier output is connected to motor 133 through conductors 131 and 132.

Motor 133 may also be a two-phase induction motor of the same type as motor 70 while amplifier 124 may be the same type of amplifier as amplifier 64.

The power winding of motor 133 is energized from line voltage conductors 43 and 44 by the following circuit: from line voltage conductor 43 through conductors 74 and 135, motor 133, and conductors 135 and 73 to line voltage conductor 44.

Motor 133 is connected to restriction 84 through a whiffletree linkage 136 through links 137, 140, 141 and 142 to move the restriction 84 in the by-pass line 83 to control the amount of fuel which is by-passed from the outlet side of pump 82 and back to the inlet side of the pump.

Motor 133 is also mechanically connected to follow up wiper arm 122 of follow up network 123 through a mechanical connection 143.

A further network 144 has resistors 145 and 146 connected across the terminals of a transformer secondary 147 energized by a primary 148. Primary 148 is connected to line voltage conductors 43 and 44 by the following circuit: from line voltage conductor 43 through conductors 95 and 151, transformer primary 148, and conductors 150 and 94 to line voltage conductor 44. A wiper arm 152 which moves across resistor 145 is connected to a center tap of transformer secondary 41 of bridge 37 through conductor 153. A center tap of transformer secondary 147 is connected to one terminal of a resistor 154 through a conductor 155. The other terminal of resistor 154 is connected to a wiper arm 156 which moves across resistor 146. A wiper arm 157 moves across resistor 154. Wiper arm 157 is connected to an input terminal of an amplifier 160 through conductor 161. The other input terminal of amplifier 160 is connected to ground terminal 162. It is thus seen that the signal input to amplifier 160 passes through resistor 36 and transformer secondary 41 of network 37, network 144, and resistor 154 to the amplifier 160 and back to ground terminals 162 and 51.

Amplifier 160 is energized from line voltage conductors 43 and 44 by the following circuit: from line voltage conductor 43 through conductors 46 and 164, amplifier 160, and conductors 163 and 45 to line voltage conductor 44. The output of amplifier 160 energizes one winding of a motor 165 through conductors 166 and 167. Amplifier 160 may also be the same type as amplifiers 64 and 124 and motor 165 may be the same type as motors 70 and 133. The power winding of motor 165 is energized by line voltage conductors 43 and 44 by the following circuit: from line voltage conductor 43 through conductors 74 and 171, motor 165, and conductors 170 and 73 to line voltage conductor 44.

Motor 165 is connected to the restriction 84 in the by-pass fuel line 83 through the other portion of the whiffletree linkage 136 through links 172, 173, 141 and 142. A stop 174 is provided to prevent motor 165 from closing down the restriction more than a predetermined amount. Motor 165 is connected to follow up wiper arm 156 moving along resistor 146 of network 144 through a mechanical connection 175.

*Operation of circuit in Figure 1*

In considering the operation of the present apparatus, it should be noted that it is desired to maintain the power output from the engine at a value selected by the main selecting lever 176. The useful power output is in terms of the thrust at which the products of combustion leave the engine, and is regulated in the present apparatus by controlling fuel flow and engine outlet opening.

To understood the operation of the entire control, consideration is first given to the electrical control networks used in the apparatus.

The operation will first be described on that half cycle of the alternating voltage wherein the upper ends of all the transformer secondaries are phased to be positive with respect to their lower ends. With the upper ends of the transformer secondaries positive with respect to their lower ends, the upper ends of the resistors in the networks are positive with respect to their lower ends. Also, let it be assumed that the circuit is in the steady-state condition, that is, the control networks are balanced and the control motors are stationary.

Considering the speed control portion of the apparatus, under the steady state conditions, the voltage existing across the network 37 when measured between wiper arm 35 and wiper arm 52 is equal and opposite the voltage across the follow up network when measured between tap 53 and wiper arm 62. Since networks 37 and 63 are connected in series to the input to amplifier 64, there is no input signal applied thereto and the amplifier is not energizing the motor 70. With the motor 70 not energized, the tail cone 20 remains stationary.

Considering the temperature control portion of the apparatus, with steady state conditions, the voltage existing across network 86, when measured between ground 88 and wiper arm 116, is equal to and opposite the voltage across the follow up network 123 when measured between the center tap of winding 117 and wiper arm 122. As the networks 86 and 123 are connected in series to the input of amplifier 124, there is no input signal applied thereto and the amplifier is not energizing the fuel control motor 133.

Further, under steady state conditions when the speed of the engine is below a predetermined value, the motor 165 is in an end position with the link 172 against the stop 174. This is evident when it is noted that the voltage in network 37, measured between wiper arm 35 and the tap of secondary 41, affecting operation of motor 165 is equal to or less than the voltage in network 144 when measured between wiper arm 152 and wiper arm 157. Since the voltages in networks 37 and 144 are connected in series to the input of amplifier 160, the signal input is phased such as to maintain the motor 165 in an end position.

Assume now that the pilot has moved his manual power selecting lever 176 in a direction to obtain more power. When manual lever 176 is moved in the maximum power direction wiper arms 52 and 115 on resistors 40 and 100, respectively, of networks 37 and 86, respectively, are moved in a downward direction. With the upper terminals of all secondaries on the positive half cycle of the power supply, as assumed above, there is an unbalance in the networks. The resultant signal across networks 37 and 63 is such that the wiper arm 62 is negative with respect to wiper arm 35. This signal results in a negative signal being applied to the input of amplifier 64. With the negative signal on the input of amplifier 64, it has an output tending to cause energization of motor 70 in a direction to move tail cone 20 to the right, as is shown in Figure 1, to decrease the size of the aperture out of which the gas stream may pass, thus increasing the pounds of thrust. This is based on the fact that the critical size, or size of the aperture which gives maximum thrust is smaller than the size to which the aperture is being decreased to.

An engine of the type for which the present control is provided may be designed to give a maximum thrust at a particular altitude for a specified aperture in the exhaust outlet. If the size of the aperture is variable the critical size of the aperture is generally at some intermediate position between the maximum and minimum possible aperture sizes obtainable. If the size of the aperture is increased beyond the critical area an increased mass flow of air passes out through the aperture. The effect of this increased mass flow is, however, completely overcome by the decreased temperature of the air and the decreased velocity of the air and the net result is to decrease the pounds of thrust or power.

If the exhaust outlet aperture should be decreased to less than the critical size the pounds of thrust would be decreased because the mass flow of air would be decreased to a greater extent than the temperature, and velocity would increase.

When the exhaust outlet area decreases the thrust increases and, because a smaller portion of the air pressure drop is across the turbine wheel, the rotation of the turbine wheel and the shaft 15 is decreased. Decreasing the rotation of the shaft slows up the governor, to move wiper arm 35 upwardly.

At the same time that motor 70 operates upon the tail cone to decrease the exhaust outlet area it also operates upon wiper arm 62 to move it upwardly along resistor 61. This operates to reduce the input voltage to amplifier 64 to zero.

The action of wiper arm 62 rebalances the system comprising networks 37 and 63 and the resulting voltage across this network is thus reduced to zero. Amplifier 64 and motor 70 are deenergized and the system for effecting movement of the tail cone is balanced out at the newly desired power level.

The effect of the temperature control apparatus is not felt immediately and will be discussed hereinafter.

In the event the craft moves to a new altitude the thrust for a given exhaust outlet area changes, due primarily to change in back pressure. This changes the speed of the turbine wheel, the shaft and the governor. The governor in turn moves wiper arm 35 in network 37. Let it be assumed that the pilot desires the same thrust and leaves the power lever in the same position. A potential difference then results across network 37 and is passed to network 63. The resulting voltage across networks 37 and 63 is sent into amplifier 64 and energizes the amplifier to operate motor 70. Motor 70 moves the tail cone to change the exhaust outlet area, and thus the thrust which changes the speed of the turbine wheel, shaft, and governor, to vary the position of wiper arm 35 on resistor 36. The motor also moves the wiper arm 62 on resistor 61. This dual action rebalances the system comprising networks 37 and 63 with the tail cone at the new position to give the engine speed which results in the desired thrust.

Thus, it is seen that movement of the tail cone is controlled by a proportioning network. The voltage resulting from movement of wiper arm 35 by the controlled condition across the proportioning network, comprising networks 37 and 63, has been reduced to zero by the movement of wiper arm 62 by the motor 70, controlled by the voltage across the proportioning network.

As noted above, movement of the manual control lever in the maximum power direction results in wiper arm 115 being moved in a downward direction along resistor 100. With the voltage phased, as above, the unbalance across network 86 is such that the wiper arm 115 is increasingly negative with respect to ground 88. The unbalance in network 86, when considered with the voltage in network 123, results in a negatively phased signal being applied to the input of amplifier 124. This effects operation of the amplifier which in turn energizes the motor 133 in a direction to move the restriction 84 in a downward direction. This movement decreases the amount of fuel which flows back to the inlet of the pump 182 and causes more fuel to be sent to nozzles 77 and 80 to increase the amount of combustion in the chamber 12 and heat up the element 85.

Heating of element 85 increases its resistance and effects a reduction in the voltage difference between ground 88 and wiper arm 115.

At the same time that motor 133 operates to close down the aperture controlled by restriction 84 it also operates upon wiper arm 122 to move it in an upwardly direction along resistor 121 to aid in reducing the voltage input to the amplifier 124 in the same manner as has been described concerning the system operating upon the tail cone.

Here too, in the event conditions should change, the temperature of the gas stream passing out of the combustion chamber changes the thrust from the value desired. The proportioning system comprising networks 86 and 123 operates to vary the size of the aperture controlled by restriction 84 to bring the temperature back to that which is desired. When the temperature varies the resistance of element 85 changes to unbalance network 86. The resulting voltage difference passes through network 123 and energizes amplifier 124 to operate motor 133. Motor 133 operates through restriction 84 to change the amount of fuel passing to nozzles 77 and 80 and thus change the temperature affecting element 85 and also moves wiper arm 122 to rebalance the system with restriction 84 at a new position to give the desired temperature.

The amount of the authority which the resistor network comprising resistors 100, 103, 104 and 112 have is determined by the position of wiper arm 116 on resistor 113. That is, if wiper arm 116 is at the upper end of resistor 113 the potential on wiper arm 116 is always that of the center tap on transformer secondary 92 no matter what the position of wiper arm 115 on resistor 100. If wiper arm 116 is at the lower end of resistor 113 the potential on the wiper arm 116 is that of wiper arm 115. Any intermediate position of wiper arm 116 along resistor 113 means that wiper arm 115 has a varying amount of authority dependent on the position of the wiper arm 116.

If the speed of shaft 15 and turbine 13 should become greater than a desired safe speed due to an excess of gases flowing from chamber 12 through the turbine, the speed limiting network 144 takes effect to decrease the amount of fuel flowing to nozzles 77 and 80.

The wiper arms 152 and 156 on resistors 145 and 146 of network 144 are set to predetermined positions so that upon the speed of the shaft 15 reaching a maximum safe speed this network takes effect in the circuit. This is accomplished as follows:

With increased speed of shaft 15 the governor 24 rotates more rapidly to move the wiper arm 35 down along resistor 36 of network 37 and change the potential between wiper arm 35 and the center tap on transformer secondary 41. The voltages on wiper arms 152 and 156 and the center tap of secondary 147 all vary correspondingly to change the potentials on the terminals of resistor 154 with respect to ground in such a manner as to affect the voltage on wiper arm 157 with respect to ground, which voltage is sent to amplifier 160 to cause energization of the amplifier.

With this signal introduced into amplifier 160 the output signal of amplifier 160 which is sent to motor 165 causes the motor 165 to move arm 141 away from stop 174. Motor 165 tends to move restriction 84 upwardly through the linkages 172, 173 and 141. Moving restriction 84 in an upward direction increases the by-pass opening around pump 82 to permit a greater amount of fuel to flow back to the fuel source, resulting in less fuel being sent to nozzles 77 and 80. The reduction in fuel flow results in a corresponding reduction in engine speed.

This control network is also a proportioning system which comprises network 144 and part of network 37. The system here effects a reduction in the fuel flow when the turbine wheel rotates more rapidly than the maximum safe speed. The network 144 has a potential difference generated thereacross which energizes amplifier 160 to operate motor 165. The motor in addition to moving the restriction to decrease the fuel to the nozzles also operates on wiper arm 156 in network 144 to aid in reducing the voltage difference across the network and balancing out the unbalance signal network with restriction 84 moved to a new position at which the speed of the turbine wheel is maintained below the maximum safe speed.

It should be understood that normally network 144 is unbalanced in such a direction as to cause motor 165 to be energized in such a direction as to maintain the right end of arm 141 against the stop 174 in the limiting position. Network 144 is thus used only as a secondary control to regulate the flow of fuel to the combustion chamber with the primary control of the fuel flow in this system being exercised by the temperature of the burned gases in the combustion chamber as has been above described. It is only when the shaft speed becomes greater than desired that the network 144 becomes effective to energize motor 165 in such a manner as to move arm 141 off stop 174.

Resistor 154, with wiper arm 157 cooperating therewith, operates as an authority potentiometer just as does resistor 113 with wiper arm 116 moving thereacross. The position of wiper arm 157 on resistor 154 determines the effect of the movement of wiper arm 156 along resistor 146 on the signal sent to amplifier 160. That is, if the wiper arm 157 is at the lower end of resistor 154 the potential on wiper arm 157 is that of wiper arm 156. If wiper arm 157 is at the upper end the potential is always that of the center tap of transformer secondary 147. Any intermediate position means that wiper arm 156 has a varying amount of authority dependent upon the position of wiper arm 157.

With the power lever moved in the "Off" direction the wiper arm 52 on resistor 40 and wiper arm 115 on resistor 100 of networks 37 and 86 respectively are moved toward the upper end. This results in reversing the phase of the potentials across networks 37 and 62 and across networks 86 and 123. Thus, signals reversed in phase to those of the conditions previously described are sent to amplifiers 64 and 124 from the follow-up networks. The outputs of these two amplifiers are now of phases to cause motors 70 and 133 to be energized in the opposite direction to that considered when the power lever was moved toward the maximum direction. Tail cone 20 is moved toward the open position to increase the effective opening in the exhaust cone 14. Restriction 84 is moved in an upward direction to increase the by-pass passage around fuel pump 82 back to the fuel source to decrease the amount of fuel emerging from nozzles 77 and 80. This decreases the temperature in the combustion chamber 12, and thus on element 85.

It is thus seen that with the circuit of Figure 1, the speed of the turbine wheel operates to control the position of the tail cone in the exhaust outlet. It has also been shown how the temperature and speed of the turbine act to control the fuel flow.

Figure 2:
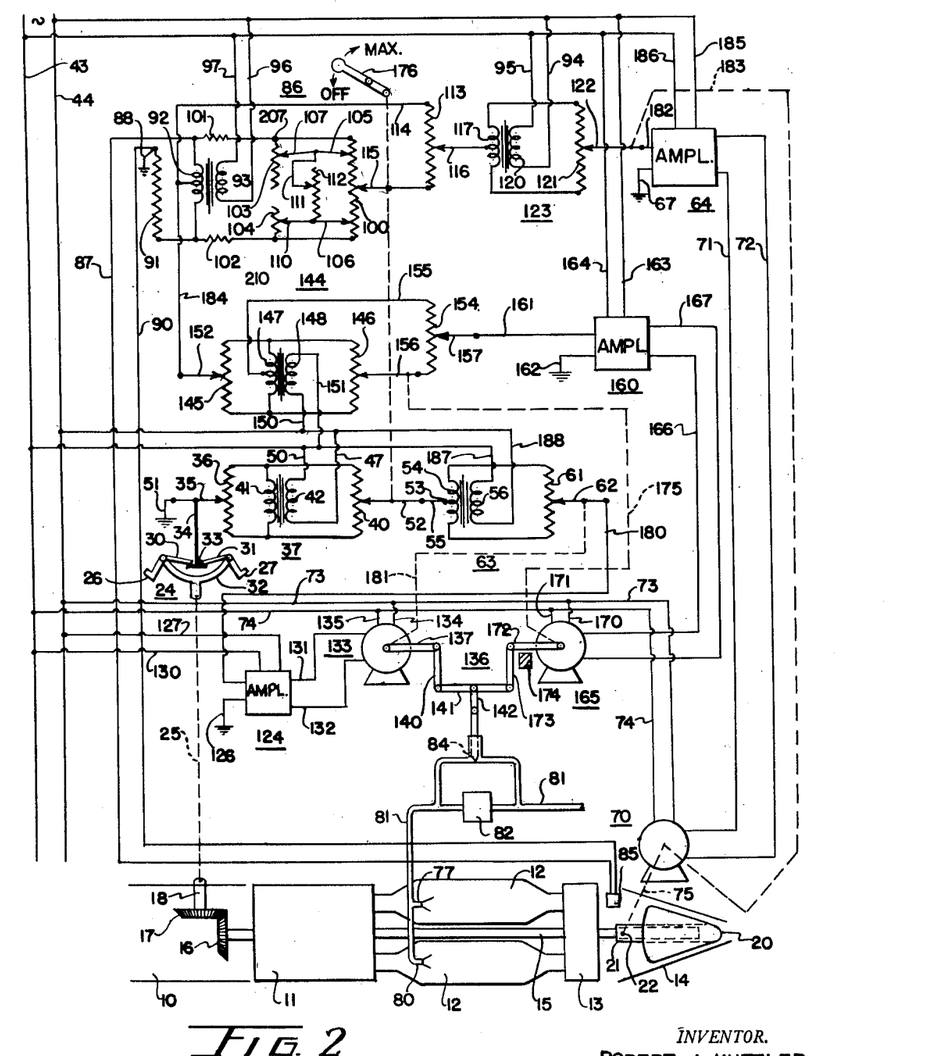
Figure 2 is a schematic drawing showing a second form the invention may take where the control functions are substantially reversed from that of the apparatus of Figure 1.

Description of the circuit of Figure 2

The control apparatus shown in Figure 2 is substantially the same as that shown in the circuit in Figure 1; however, its association with the combustion engine is reversed to that of Figure 1. Corresponding components of the apparatus and engine have the same reference numerals. The important differences between the circuits of Figure 1 and Figure 2 are that in the circuits shown in Figure 1 the speed of rotation of the turbine wheel controls the positioning of the tail cone with a speed limiting network assisting in the control of the fuel flow while the major control of the fuel flow in the circuit of Figure 1 is governed by the temperature in the combustion chamber. In the circuit in Figure 2 the speed of rotation of the turbine wheel is the primary control for the fuel flow while the temperature governs the positioning of the tail cone with a temperature limiting network assisting in the control of the fuel flow, when a maximum temperature is exceeded.

In the circuit shown in Figure 2 it is seen that the shaft speed of rotation operates the governor 24 to control the signal output of the network 37 which is sent to a follow up network 63, just as is done in the circuit in Figure 1. In the circuit in Figure 2, however, the output from the wiper arm 62 of the follow up network 63 is connected to the amplifier 124 through conductor 180. Operation of amplifier 124 governs the energization of motor 133 to operate upon restriction 84 in the by-pass line of the fuel line.

As in the circuit of Figure 1 the resistance of element 85, which is affected by the temperature of the combustion chamber, affects the signal output of network 86 which passes through the follow up network 123. The output of follow up network 123 in the circuit of Figure 2, however, is impressed on the input circuit of amplifier 64 through conductor 182. In both Figures 1 and 2 operation of amplifier 64 affects the energization of motor 70 to control the positioning of the tail cone 20.

In the circuit of Figure 2 network 144 is utilized as a temperature limiting network rather than as a speed limiting network as in the circuit of Figure 1 in that wiper arm 152, riding along resistor 145, is connected to the center tap of transformer secondary 92 of network 86 rather than to the center tap of secondary 41 of network 37. The operation of network 144 is the same as that described for the same network in Figure 1. The output of network 144 is again sent to the amplifier 160 which operates to energize motor 165 to effect a limiting control upon the restriction 84 in the fuel line.

In the circuit shown in Figure 2 the rotors of motors 70 and 133 are connected to wiper arms 122 and 62 through mechanical connections 183 and 181 respectively while in the circuit of Figure 1 the connections are reversed.

The rotor of motor 165 is connected through mechanical connection 175 to wiper arm 156 on resistor 146 of network 144, in both Figures 1 and 2. This is to reduce the signal output of network 144 to such a value that the signal does not operate through amplifier 160 and motor 165. Motor 165 is thus not effective upon the restriction 84 of the by-pass passage to control the fuel flow.

Primary winding 93 of the network 86 is shown in Figure 2 as being energized from power voltage conductors 43 and 44 by the following circuit; from line voltage conductor 43, through conductors 186 and 97, transformer primary 93, and conductors 96 and 185 to line voltage conductor 44. Transformer primary 120 of follow up network 123 is energized from line voltage conductors 43 and 44 by the following circuit: line voltage conductor 43 through conductors 186 and 95, transformer primary 129, and conductors 94 and 185 to line voltage conductor 44. Amplifier 64 is shown energized from line voltage conductors 43 and 44 through conductors 185 and 186.

The primary winding 56 of follow up network 63 is shown to be energized from line voltage conductors 43 and 44 through conductors 187 and 188. Primary winding 42 of network 37 is energized from line voltage conductors 43 and 44 by the following circuit; from line voltage conductor 43 through conductors 187 and 50, transformer primary 42, and conductors 47 and 188 to line voltage conductor 44. Transformer primary 148 of network 144 is energized from line voltage conductors 43 and 44 by the following circuit; from line voltage conductor 43 through conductors 187 and 151, transformer primary 148, and conductors 150 and 188 to line voltage conductor 44.

Amplifier 160 is energized from line voltage conductors 43 and 44 by the following circuit; from line voltage conductor 43 through conductors 186 and 164, amplifier 160, and conductors 163 and 185 to line voltage conductor 44. Motors 70, 133 and 165 and amplifier 124 are energized by the same circuits as were described in the system for Figure 1.

Operation of the circuit of Figure 2

When the power lever is moved in the maximum direction wiper arm 115 is moved downwardly along resistor 100 to produce a voltage difference across network 86 which is passed through network 123 to amplifier 64. Energization of amplifier 64 operates motor 70 to move the tail cone toward the closed direction.

At the same time that the power lever moves wiper arm 115 downwardly it also moves wiper arm 52 downwardly along resistor 40 to produce a voltage difference across network 37 which passes through network 63 to amplifier 124. Amplifier 124 operates motor 133 to move restriction 84 such as to decrease the size of the opening in the passage around the fuel pump and send an increased amount of fuel to nozzles 77 and 80. This increases the temperature in the combustion chamber to increase the resistance of element 85 and reduce the voltage difference across network 86.

At the same time that motor 70 moves the tail cone it also moves wiper arm 122 upwardly along resistor 121 to aid in reducing the voltage input to amplifier 64. When the temperature is at the value to obtain the newly desired thrust the voltage difference across networks 86 and 123 has been reduced to zero and amplifier 64 and motor 70 are deenergized.

Decreasing the exhaust outlet area increases the thrust and slows up the turbine wheel and shaft rotation and causes governor 24 to move wiper arm 35 upwardly along resistor 36.

At the same time that motor 133 moves the restriction 84 it also moves wiper arm 62 upwardly along resistor 61 to reduce the voltage input to amplifier 124 to zero. Thus, the voltage difference across networks 37 and 63 is reduced to zero when the shaft speed is such as to give the newly desired thrust.

When the power lever is moved in the Off direction wiper arms 115 and 52 are moved upwardly along their resistors and cause operation of motors 70 and 133 in the opposite directions to that just described to increase the exhaust outlet opening, decrease the fuel flow to the nozzles, and move wiper arms 122 and 62 downwardly to again rebalance the proportioning networks comprising networks 86 and 123 and networks 37 and 63.

In the event conditions should change so that the thrust is no longer that which is desired it is reflected in a change in shaft speed and temperature to unbalance networks 37 and 86, resulting in energization of amplifiers 64 and 124. Motors 70 and 133 are operated to change the tail cone position and vary the fuel flow to the nozzles and also move wiper arms 62 and 122. Changing the tail cone position and varying the fuel flow brings about a change in the voltage differences across networks 37 and 86. The proportioning network comprising networks 37 and 63 and the proportioning network comprising networks 86 and 123 balance out at a new exhaust outlet opening and a new temperature to give the desired thrust.

With the exception that network 144 operates off the temperature sensitive network 86 rather than off the speed sensitive network 37 its operation is the same as has been described in its relation to the rest of the circuit of Figure 1.

It is thus seen that in the circuit of Figure 2 the speed of the turbine wheel operates to control the fuel flow. It has also been shown how the temperature acts to control both the tail cone position and the rate of fuel flow.

Figure 3:
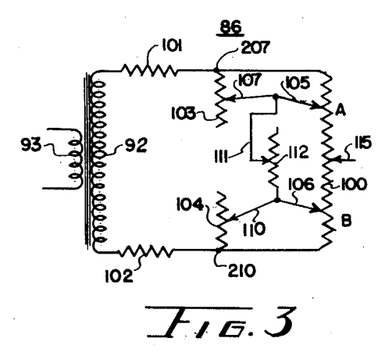
Figure 3 shows a portion of the control network shown in the circuits of Figures 1 and 2.
Figure 4:
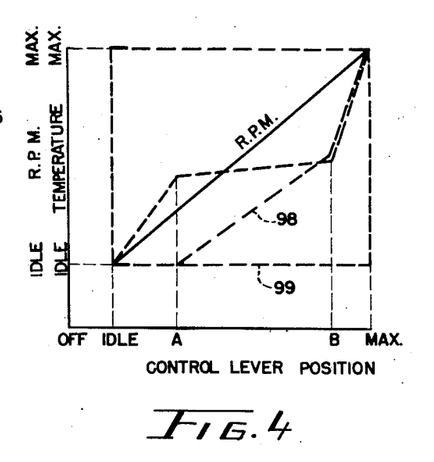
Figure 4 is a graph showing possible operating curves of the network shown in Figure 3.

*Explanation of Figures 3 and 4*

In order to understand the functioning of network 86, it is shown in Figure 3 separated from the rest of the electrical control network. In Figure 4, there is shown a set of operating characteristics that may be expected when the manually controlled wiper arm 115 is moved over the resistor 100 in network 86. The functioning of network 86 will be explained with reference to the graph of Figure 4.

Let it be assumed that wiper arm 115 moves from the upper, or idle position, to the lower or maximum position along resistor 100. This movement of the wiper arm 115 is plotted as the abscissa of the graph in Figure 4. The resulting control point selection of temperature is plotted as the ordinate of the graph. Also shown on the graph is the engine R. P. M. selected when the main control lever 176 is moved through its condition selecting range.

Assume that resistors 103, 104 and 112 are of equal magnitude and are each relatively small in magnitude when compared to the magnitude of the resistance of resistor 100. Also, current limiting resistors 101 and 102 are presumed to be large with respect to the other resistors so that the voltage drop across the current limiting resistors will be essentially constant. Thus the effect of these resistors on the operation of the circuit may be neglected and the voltage between terminals 207 and 210, opposite those ends of resistors 101 and 102 connected to transformer secondary 92, shall be considered as constant.

The positions of wiper arms 107, 111 and 110 on resistors 103, 112 and 104 determine the slopes present in the various portions of the voltage curve picked off by wiper arm 115 as it is moved between the "Idle" and "Max" positions by the control lever. The positions of wiper arms 105 and 106 along resistor 100 determine the points on the curve at which the slope will change. The positions of wiper arms 105 and 106 are designated as points A and B respectively along resistor 100 and on the abscissa of the graph of Figure 4.

The voltages between terminal 207 and wiper arm 107 on resistor 103, between wiper arm 111 and the lower terminal of resistor 112, and between wiper arm 110 on resistor 104 and terminal 210 add up to comprise the total voltage difference between terminals 207 and 210. Movement of any of wiper arms 107, 111 and 110 along its respective resistor will change the voltage drop across the effective portion of each of the resistors and it is obvious that changing the position of any one of the wiper arms operates to change the slope of all portions of the curve except for the extreme cases where wiper arm 107 is at terminal 207 or wiper arm 110 is at terminal 210 or where both wiper arms are at their respective terminals. That is, when wiper arm 107 is at terminal 207 there is no voltage drop across any portion of resistor 103 but rather the entire voltage drop is across the portions of resistor 112 between wiper arm 111 and the lower terminal of the resistor 112 and resistor 104 between wiper arm 110 and terminal 210. This is because there is then no voltage drop between the upper end of resistor 100 and point A on resistor 100 and the slope for this portion of the curve is zero with slopes changing for the other two portions of the curve with movement of wiper arm 111 or 110. If wiper arm 110 is at terminal 210 the slope of the curve between point B and the lower end of resistor 100 is zero with the slopes changing for the other two portions of the curve with movement of wiper arm 107 or 111.

If wiper arm 107 is at terminal 207 and wiper arm 110 is at terminal 210 both the first and last portions of the curve have zero slope with the portion of the curve between points A and B rising from Idle to Max in a slope which is always constant no matter what the position of wiper arm 111 is on resistor 112. However, except for these three extreme cases the slopes of all portions of the curve change with movement of any of wiper arms 107, 110 or 111.

Movement of either wiper arm 105 or 106 along resistor 100 will cause the slopes of the curve on both sides of the point representing the position of that wiper arm to change but will not affect the slopes of the remaining portions of the curve except for the extreme cases where either or both wiper arms 107 and 110 are at terminals 207 and 210 respectively, when the slopes of the first or last or both first and last portions of the curve are zero. In such case the portion of the curve having zero slope continues to have zero slope with only the slope of the center portion changing. However, if both wiper arms 105 and 106 should move together in the same direction for the same distance the slope of the center portion of the curve does not change.

It should be noted that with this type of network every portion of the curve has either a positive slope, or at most an infinite slope and at least a zero slope, but that the slope is never in any case negative when the movement is from the Idle to Max position.

Movement of wiper arm 115 along resistor 100 is controlled by the manual power lever to pick off the voltage along the resistor which is representative of the temperature desired at the power setting chosen by the pilot. The potential on wiper arm 115 is operative upon a motor to control the fuel flow to directly regulate the temperature in the system shown in Figure 1, or to control the tail cone position in the system shown in Figure 2.

It is seen that the potential change on wiper arm 115 is not linear with movement of the wiper arm along resistor 100. This means of obtaining a non-linear output with a linear movement may be used in any system in which a non-linear potential change for a linear movement is desired.

Figure 5:
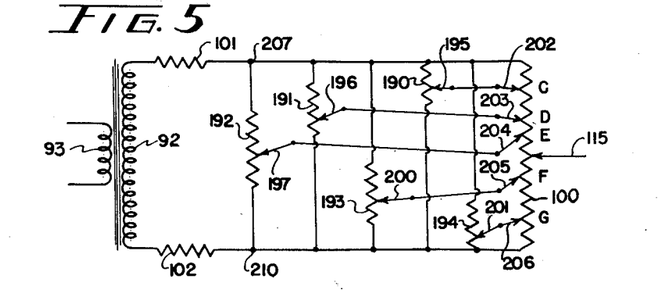
Figure 5 is a portion of a modified network which may be substituted for the network shown in Figure 3.
Figure 6:
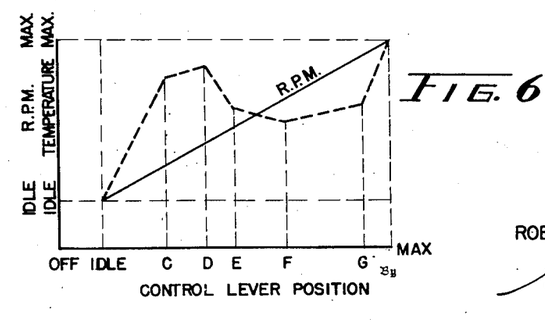
Figure 6 is a graph showing a possible operating curve of the network shown in Figure 5.

*Discussion of Figures 5 and 6*

The type of network shown in Figure 5 can be substituted for the network shown in Figure 3 in the system of Figures 1 and 2. With this type of network it is possible for various portions of the curve to have a negative slope when the control selector is adjusted from an "Idle" position to a "Max" position.

In the network of Figure 5 a number of potentiometers have been substituted for the rheostats in the network in Figure 3. In the example network shown the potentiometers 190, 191, 192, 193 and 194 have been placed in parallel with resistor 100 across transformer secondary 92. Wiper arms 195, 196, 197, 200 and 201 operate along potentiometers 190, 191, 192, 193 and 194 respectively.

Corresponding to the five potentiometers which have been placed into the circuit in parallel with resistor 100 are five wiper arms 202, 203, 204, 205 and 206 which make contact with resistor 100. Wiper arms 202, 203, 204, 205 and 206 are connected to wiper arms 195, 196, 197, 200 and 201 respectively.

Let it also be assumed that the resistance values of potentiometers 190, 191, 192, 193 and 194 are all equal in magnitude and are relatively small in magnitude when compared with the magnitude of resistor 100. The curve of Figure 6 is drawn for the positions of the wiper arms approximately as shown in Figure 5.

The positions of the wiper arms cooperating with potentiometers 190, 191, 192, 193 and 194 determine the slopes of the various portions of the temperature curve. The positions of the wiper arms 202, 203, 204, 205 and 206 along resistor 100 determine the points along the curve at which the slopes will change. The positions of the wiper arms 202, 203, 204, 205 and 206 along resistor 100 are denoted on resistor 100 in Figure 5 and along the abscissa of the graph of Figure 6 as C, D, E, F and G respectively.

As the entire voltage between terminals 207 and 210 is across each of the potentiometers it obviously is possible for the portions of the curve of the voltage along resistor 100 to have a negative slope. For example, if wiper arm 196 should be at the bottom end of potentiometer 191 and wiper arm 197 should be at the upper end of potentiometer 192 the potential at point D would be that of terminal 210 while the potential at point E would be that of terminal 207. Terminal 207 corresponds to the idling position and terminal 210 corresponds to the maximum power position. This can be seen by noting, in Figures 1 and 2 that movement of the power lever 176 in the "Off" direction moves wiper arm 115 to the upper end of resistor 100, which has the same potential as terminal 207, while movement in the "Max" direction moves wiper arm 115 to the lower end of resistor 100, which has the same potential as terminal 210. Thus, the temperature indication at point D, which is determined by the position of wiper arm 196 on resistor 191, is at Max and the temperature indication at point E, which is determined by the position of wiper arm 197 on resistor 192, is at Idle and so the curve slopes from Max to Idle between points D and E and has a negative slope.

Because the curve must terminate at the extreme positions of Idle and Max it is not possible for the portions of the curve between Idle and C and between G and Max to have a slope less than zero. That is, these portions of the curve cannot have negative slopes.

If, for example, wiper arms 200 and 201 are at the same potential points on resistors 193 and 194 respectively the slope of the curve between points F and G is zero.

Movement of any of wiper arms 195, 196, 197, 200 or 201 changes the slope of the portion of the curve on each side of the point on the curve, the value of which is determined by the moving wiper arm. Movement of any of wiper arms 202, 203, 204, 205, and 206 changes the slope of the portion of the curve on each side of the point on the curve, the position of which is determined by the moving wiper arm except for the extreme cases wherein one or both portions of the curve have zero slope.

If two adjacent wiper arms riding along resistor 100 move together the same distance in the same direction the slope of the curve between these two points does not change.

Because of the flexibility of this system it may be used in a gas turbine type of engine, for example, to control the operating temperatures with changes in speed to prevent the temperatures from rising past safe values into the "surge" region where the engine loses its thrust. It could also be used in virtually any system where it is desired to have the controlled variable vary non-linearly with a linear movement of the controlling device.

*Conclusion*

It can thus be seen that I have provided a combustion engine control utilizing the temperature of the burned gases and the engine speed to control the flow of fuel for combustion to heat the gases to the desired temperature and also to control the size of the exhaust outlet opening for regulating the engine speed. I have also provided an electrical motor control sufficiently flexible so that the energization of the motor may be varied non-linearly with linear movement of the control pick-off.

Because modifications may be made by those skilled in the art without involving invention it is to be understood that the present invention is limited only by the scope of the appended claims.

I claim as my invention:

1. In a control apparatus for a combustion jet propulsion engine having a variable exhaust opening and a fuel flow control device, first and second motor means for controlling the fuel flow control device, third motor means for controlling the variable exhaust opening, engine speed responsive means connected in controlling relation to said third motor means, engine temperature responsive means for controlling said first motor means to vary the fuel delivery to the engine in response to the engine temperature, and override means including said second motor means and said engine speed responsive means for reducing the delivery of fuel to the engine when the engine speed exceeds a predetermined value.

2. A control apparatus for a combustion jet propulsion engine having a variable exhaust opening with means for varying said opening and for controlling the amount of fuel flow to the engine, comprising: a first controlling means including a temperature sensing element so positioned as to indicate the engine temperature; a second controlling means including means responsive to engine speed; motor means to regulate the exhaust opening and control the amount of fuel flow; electrical network means connecting said controlling means to said motor means to apply a signal voltage thereto and to control the operation of said motor means; a further motor means connected to said electrical network means and controlled thereby, said further motor means controlling the amount of fuel flow upon one of said controlling means reaching a predetermined limiting value; and further means operated by said motor means to reduce the signal voltage to said motor means to zero upon the proper size of the exhaust opening and the proper amount of fuel flow being attained to give the desired engine temperature and engine speed of rotation.

3. A control apparatus for a combustion jet propulsion engine having a variable exhaust opening with means for varying said opening and for controlling the amount of fuel flow to the engine, comprising: a first controlling means including a temperature sensing element so positioned as to indicate the engine temperature; a second controlling means including means responsive to engine speed; motor means to regulate the exhaust opening and control the amount of fuel flow; electrical network means connecting said controlling means to said motor means to apply a signal voltage thereto and to control the operation of said motor means; means for varying the signal voltage from said electrical network means to said motor means to cause the motor means to change the size of the exhaust opening and the amount of fuel flow such as to give a newly desired engine temperature and engine speed of rotation; a further motor means connected to said electrical network means and controlled thereby, said further motor means controlling the amount of fuel flow upon one of said controlling means reaching a predetermined limiting value; and further means operated by said motor means to reduce the signal voltage from said electrical network means to said motor means to zero upon the size of the exhaust opening arriving at the size and the amount of fuel flow arriving at the amount necessary to give the newly desired engine temperature and engine speed of rotation.

4. A control apparatus for a combustion jet propulsion engine having a variable exhaust opening with means for varying said opening and for controlling the amount of fuel flow to the engine comprising: a temperature sensing element so positioned as to indicate the engine temperature; controlling means operated by the engine speed of rotation; motor means to regulate the exhaust opening and control the amount of fuel flow; and electrical network means connecting said element and said controlling means to said motor means to control the operation of said motor means; a portion of said electrical network means including a transformer secondary having a first terminal and a second terminal, a plurality of resistors connected to said terminals including a first resistor connected across said terminals, a plurality of wiper arms movable along said resistors, a pick-off movable along said first resistor, and means interconnecting said wiper arms such as to produce a non-linear change of output voltage from said portion of said electrical network means with a linear movement of said pick-off along said first resistor.

5. In a jet engine automatic control system, means positioning a variable area tail cone and controlling the amount of fuel flow, comprising: a temperature sensing element so positioned as to indicate the engine temperature; controlling means operated by the engine speed of rotation; motor means to position the tail cone and control the amount of fuel flow; and electrical network means connecting said element and said controlling means to said motor means to control the operation of said motor means; a portion of said network means including a transformer secondary having a first terminal and a second terminal, a first resistor connected across said terminals, a second resistor having one terminal thereof connected to said first terminal of said transformer secondary, a third resistor having one terminal thereof connected to said second terminal of said transformer secondary, a fourth resistor, a first wiper arm and a second wiper arm operatively moved with respect to said first resistor, a wiper arm operatively moved with respect to said second resistor, a wiper arm operatively moved with respect to said third resistor, a wiper arm operatively moved with respect to said fourth resistor; said first wiper arm operatively moved with respect to said first resistor and said wiper arms operatively moved with respect to said second and fourth resistors being electrically connected together; and said second wiper arm operatively moved with respect to said first resistor, said wiper arm operatively moved with respect to said third resistor, and one terminal of said fourth resistor being electrically connected together.

6. In a control apparatus for a combustion jet propulsion engine, means controlling the amount of fuel flow, comprising: a first controlling means including a temperature sensing element so positioned as to indicate the engine temperature; a second controlling means including means responsive to engine speed; first motor means and second motor means to control the amount of fuel flow; and electrical network means connecting said controlling means to said first motor means and said second motor means to apply a signal voltage thereto and to cause said first motor means to be constantly effective to control the amount of fuel flow and to cause said second motor means to be effective to control the amount of fuel flow only upon one of the controlling means reaching a predetermined limiting value; and further means, operated by said motor means, to reduce the signal voltage to said motor means to zero upon the proper amount of fuel flow being reached to give the desired engine temperature and engine speed.

7. In a control apparatus for a combustion jet propulsion engine, means positioning a variable area tail cone and controlling the amount of fuel flow, comprising: a temperature sensing element so positioned as to indicate the engine temperature; a first electrical resistance network having one arm thereof composed of said element; a first motor means controlling said tail cone area; means connecting said first network to said first motor means to control the operation thereof; a second electrical resistance network producing an electrical signal voltage dependent upon the engine speed of rotation; a second motor means controlling the amount of fuel flow; means connecting said second network to said second motor means to control the operation thereof, a portion of said first network means including a transformer secondary having a first terminal and a second terminal, a first resistor connected across said terminals, a second resistor having one terminal thereof connected to said first terminal of said transformer secondary, a third resistor having one terminal thereof connected to said second terminal of said transformer secondary, a fourth resistor, a first wiper arm and a second wiper arm operatively moved with respect to said first resistor, a wiper arm operatively moved with respect to said second resistor, a wiper arm operatively moved with respect to said third resistor, a wiper arm operatively moved with respect to said fourth resistor; said first wiper arm operatively moved with respect to said first resistor and said wiper arms operatively moved with respect to said second and fourth resistors being electrically connected together; and said second wiper arm operatively moved with respect to said first resistor, said wiper arm operatively moved with respect to said third resistor, and one terminal of said fourth resistor being electrically connected together.

8. In a control apparatus for a combustion jet propulsion engine, means positioning a variable area tail cone and controlling the amount of fuel flow, comprising; a temperature sensing element so positioned as to indicate the engine temperature, a first electrical resistance network having one arm thereof including said element, a first motor means controlling said tail cone area, means connecting said first network to said first motor means to control the operation thereof, a second electrical resistance network producing an electrical signal voltage dependent upon the engine speed of rotation, a second motor means controlling the amount of fuel flow, means connecting said second network to said second motor means to control the operation thereof, third motor means controlling the amount of fuel flow, and a third resistance electrical network connected to said first resistance network and to said third motor means to control the operation of said third motor means upon the temperature being sensed rising to a maximum predetermined value.

9. In a control apparatus for a combustion jet propulsion engine, means positioning a variable area tail cone and controlling the amount of fuel flow, comprising: a temperature sensing element so positioned as to indicate the engine temperature, a first electrical resistance network having one arm thereof including said element, a first motor means controlling said tail cone area, means connecting said first network to said first motor means to control the operation thereof, a second electrical resistance network producing an electrical signal voltage dependent upon the engine speed of rotation, a second motor means controlling the amount of fuel flow, means connecting said second network to said second motor means to control the operation thereof, third motor means controlling the amount of fuel flow, a third electrical resistance network connected to said first electrical resistance network and to said third motor means to control the operation of said third motor means upon the temperature being sensed rising to a maximum predetermined value, manual control lever means to vary the signal voltage from said first network to said first motor means to cause said first motor means to vary the tail cone area and to vary the signal voltage from said second network to said second motor means to cause said second motor means to change the amount of fuel flow such as to give a newly desired engine temperature and engine speed of rotation, further means operated by said first motor means to reduce the signal voltage from said first network to said first motor means to zero upon the tail cone area arriving at that area to give the newly desired engine temperature, and further means operated by said second motor means to reduce the signal voltage from said second network to said second motor means to zero upon the amount of fuel flow reaching that quantity to give the newly desired engine speed of rotation.

10. In a control apparatus for a combustion jet propulsion engine, means positioning a variable area tail cone and controlling the amount of fuel flow, comprising: a temperature sensing element so positioned as to indicate the engine temperature; a first electrical resistance network having one arm thereof including said element; a first motor means controlling said tail cone area; means connecting said first network to said first motor means to control the operation thereof; a second electrical resistance network producing an electrical signal voltage dependent upon the engine speed of rotation; a second motor means controlling the amount of fuel flow; means connecting said second network to said second motor means to control the operation thereof; third motor means controlling the amount of fuel flow; a third electrical resistance network connected to said first resistance network and to said third motor means to control the operation of said third motor means upon the temperature being sensed rising to a maximum predetermined value; a portion of said first network means including a transformer secondary having a first terminal and a second terminal, a first resistor connected across said terminals, a second resistor having one terminal thereof connected to said first terminal of said transformer secondary, a third resistor having one terminal thereof connected to said second terminal of said transformer secondary, a four resistor, a first wiper arm and a second wiper arm operatively moved with respect to said first resistor, a wiper arm operatively moved with respect to said second resistor, a wiper arm operatively moved with respect to said third resistor, a wiper arm operatively moved with respect to said fourth resistor; said first wiper arm operatively moved with respect to said first resistor and said wiper arms operatively moved with respect to said second and fourth resistors being electrically connected together; and said second wiper arm operatively moved with respect to said first resistor, said wiper arm operatively moved with respect to said third resistor, and one terminal of said fourth resistor being electrically connected together.

11. In a control apparatus for a combustion jet propulsion engine, means positioning a variable area tail cone and controlling the amount of fuel flow, comprising; a temperature sensing element so positioned as to indicate the engine temperature, a first electrical resistance network having one arm thereof including said element, a first motor means controlling the amount of fuel flow, means connecting said first network to said first motor means to control the operation thereof, a second electrical resistance network producing an electrical signal voltage dependent upon the engine speed of rotation, a second motor means controlling said tail cone area, means connecting said second network to said second motor means to control the operation thereof, third motor means controlling the amount of fuel flow, and a third electrical resistance network connected to said second electrical resistance network and to said third motor means to control the operation of said third motor means upon the speed of rotation of the engine rising to a maximum predetermined value.

12. In a control apparatus for a combustion jet propulsion engine, means positioning a variable area tail cone and controlling the amount of fuel flow, comprising; a temperature sensing element so positioned as to indicate the engine temperature, a first electrical resistance network having one arm thereof including said element, a first motor means controlling the amount of fuel flow, means connecting said first network to said first motor means to control the operation thereof, a second electrical resistance network producing an electrical signal voltage dependent upon the engine speed of rotation, a second motor means positioning said tail cone, means connecting said second network to said second motor means to control the operation thereof, third motor means controlling the amount of fuel flow, a third electrical resistance network connected to said second electrical resistance network and to said third motor means to control the operation of said third motor means upon the speed of rotation of the engine rising to a maximum predetermined value, manual control lever means to vary the signal voltage from said first network to said first motor means to cause said first motor means to vary the amount of fuel flow and to vary the signal voltage from said second network to said second motor means to cause said second motor means to vary the tail cone area such as to give a newly desired engine temperature and engine speed of rotation, further means operated by said first motor means to reduce the signal voltage from said first bridge to said first motor means to zero upon the amount of fuel flow reaching that quantity to give the newly desired engine temperature, and further means operated by said second motor means to reduce the signal voltage from said second network to said second motor means to zero upon the tail cone area arriving at that area to give the newly desired engine speed of rotation.

13. A signaling device comprising an electrical network means; said network means including a source of voltage having a first terminal and a second terminal, a first resistor connected across said terminals, a plurality of resistors connected to said terminals, a plurality of wiper arms movable along said resistors, a pick-off movable along said first resistor, means including said pick-off for obtaining an output voltage from said network means, and means interconnecting said wiper arms such as to produce a non-linear change of output voltage from said network means with a linear movement of said pick-off along said first resistor.

14. A signaling device comprising an electrical network means; said network means including a source of voltage having a first terminal and a second terminal, a first resistor connected across said terminals, a pick-off movable along said first resistor, means including said pick-off for obtaining a voltage output from said network means, a second resistor having one terminal thereof connected to said first terminal of said source of voltage, a third resistor having one terminal thereof connected to said second terminal of said source of voltage, a first wiper arm and a second wiper arm operatively moved with respect to said first resistor, a wiper arm operatively moved with respect to said second resistor, a wiper arm operatively moved with respect to said third resistor, said first wiper arm operatively moved with respect to said first resistor and said wiper arm operatively moved with respect to said second resistor being electrically connected together and said second wiper arm operatively moved with respect to said first resistor and said wiper arm operatively moved with respect to said third resistor being electrically connected together to produce a non-linear change of output voltage from said network means with linear movement of said pick-off along said first resistor.

15. In a motor control system for a condition control apparatus: first motor means for controlling a first condition changing device; second motor means for controlling a second condition changing device; a plurality of electrical networks circuits, first condition responsive means; means including one of said network circuits for connecting said first responsive means in controlling relation to said first condition changing device; second condition responsive means; second means including another of said network circuits for connecting said second responsive means in controlling relation to said second condition changing device; third motor means; further means including still another network circuit for connecting said second condition responsive means in controlling relation to said third motor means, said third motor means being operable to override said first motor means and circuit means for simultaneously adjusting the balance of each of said network circuits.

16. In a motor control system for a condition control apparatus: a first motor; a second motor; a third motor; a first electrical network; a second electrical network; a third electrical network; said first network being operatively connected with said first motor to cause rotation of said motor upon unbalance of said network; said second network being operatively connected with said second motor to cause rotation of said motor upon unbalance of said network; said third network being operatively connected with said third motor to cause rotation of said motor upon an unbalance in the proper direction of said network; a first condition responsive control means; a second condition responsive control means; said first condition responsive control means being connected to said first network and said third network to unbalance said networks upon said first condition varying from a desired value; said second condition responsive control means being connected to said second network to unbalance said network upon said second condition varying from a desired value; said first motor being connected to first means which, upon said motor being energized, operates to return said first condition to the desired value; said second motor being connected to second means which, upon said motor being energized, operates to return said second condition to the desired value; said third motor being connected to third means which, upon rotation of said motor, operates to return said second condition to the desired value; and fourth means for simultaneously unbalancing said first and second networks to cause them to be rebalanced at newly desired values.

17. In a motor control system for a condition control apparatus: a first motor; a second motor; a first electrical network; a second electrical network; said first network being operatively connected with said first motor to cause rotation of said first motor upon unbalance of said first network; said second network being operatively connected with said second motor to cause rotation of said second motor upon unbalance of said second network; a first condition responsive control means; a second condition responsive control means; said first condition responsive control means being connected to said first network to unbalance said first network upon said first condition varying from a desired value; said second condition responsive control means being connected to said second network to unbalance said second network upon said second condition varying from a desired value; said first motor being connected to first means which, upon said first motor being energized, operates to return said first condition to the desired value; said second motor being connected to second means which, upon said second motor being energized, operates to return said second condition to the desired value; third motor responsive to said second condition responsive control means, said third motor being connected to a third means which, upon operation of said third motor, operates to override the effect of said first motor on said first condition; and third means for simultaneously unbalancing said first and second networks to cause them to be rebalanced at newly desired values, one of said networks changing from its original balance point to its new balance point with a linear movement and the other of said networks changing from its original balance point to its new balance point with a nonlinear movement.

18. In a motor control system for a condition control apparatus: a first motor; a second motor; a first electrical network; a second electrical network; said first network being operatively connected with said first motor to cause rotation of said first motor upon unbalance of said first network; said second network being operatively connected with said second motor to cause rotation of said second motor upon unbalance of said second network; a first condition responsive control means; a second condition responsive control means; said first condition responsive control means being connected to said first network to unbalance said first network upon first condition varying from a desired value; said second condition responsive control means being connected to said second network to unbalance said second network upon said second condition varying from a desired value; said first motor being connected to first means which, upon said first motor being energized, operates to return said first condition to the desired value; said second motor being connected to second means which, upon said second motor being energized, operates to return said second condition to the desired value; and third means for simultaneously unbalancing said first and second networks to cause them to be rebalanced at newly desired values; one of said networks including a transformer secondary having a first terminal and a second terminal, a first resistor connected across said terminals, a pickoff movable along said first resistor to obtain a voltage output from said network, a second resistor having one terminal thereof connected to said first terminal of said transformer secondary, a third resistor having one terminal thereof connected to said second terminal of said transformer secondary, a first wiper arm and a second wiper arm operatively moved with respect to said first resistor, a wiper arm operatively moved with respect to said second resistor, a wiper arm operatively moved with respect to said third resistor, said first wiper arm operatively moved with respect to said first resistor and said wiper arm operatively moved with respect to said second resistor being electrically connected together and said second wiper arm operatively moved with respect to said first resistor and said wiper arm operatively moved with respect to said third resistor being electrically connected together to produce a nonlinear change of output voltage from said network with linear movement of said pickoff along said first resistor.

19. In a motor control system for a condition control apparatus: a first motor; a second motor; a third motor; a first electrical network; a second electrical network; a third electrical network; said first network being operatively connected with said first motor to cause rotation of said first motor upon unbalance of said first network; said second network being operatively connected with said second motor to cause rotation of said second motor upon unbalance of said second network; said third network being operatively connected with said third motor to cause rotation of said third motor upon an unbalance in the proper direction of said third network; a first condition responsive control means; a second condition responsive control means; said first condition responsive control means being connected to said first network and said third network to unbalance said first and third networks upon said first condition varying from a desired value; said second condition responsive control means being connected to said second network to unbalance said second network upon said second condition varying from a desired value; said first motor being connected to first means which, upon said first motor being energized, operates to return said first condition to the desired value; said second motor being connected to second means which, upon said second motor being energized, operates to return said second condition to the desired value; said third motor being connected to third means which, upon rotation of said third motor, operates to return said second condition to the desired value; and fourth means for simultaneously unbalancing said first and second networks to cause them to be rebalanced at newly desired values, one of said networks changing from its original balance point to its new balance point with a linear movement and another of said networks changing from its original balance point to its new balance point with a non-linear movement.

20. In a motor control system for a condition control apparatus; a first motor, a second motor; a first electrical network; a second electrical network; said first network being operatively connected with said first motor to cause rotation of said first motor upon unbalance of said first network; said second network being operatively connected with said second motor to cause rotation of said second motor upon unbalance of said second network; a first condition responsive control means; a second condition responsive control means; said first condition responsive control means being connected to said first network to unbalance said first network upon said first condition varying from a desired value; said second condition responsive control means being connected to said second network to unbalance said second network upon said second condition varying from a desired value; said first motor being connected to first means which, upon said first motor being energized, operates to return said first condition to the desired value; said second motor being connected to second means which, upon said second motor being energized, operates to return said second condition to the desired value; and third means for simultaneously unbalancing said first and second networks to cause them to be rebalanced at newly desired values; one of said networks including a transformer secondary having a first terminal and a second terminal, a first resistor connected across said terminals, a pick-off movable along said first resistor to obtain a voltage output from said network, a second resistor having one terminal thereof connected to said first terminal of said transformer secondary, a third resistor having one terminal thereof connected to said second terminal of said transformer secondary, a first wiper arm and a second wiper arm operatively moved with respect to said first resistor, a wiper arm operatively moved with respect to said second resistor, a wiper arm operatively moved with respect to said third resistor, said first wiper arm operatively moved with respect to said first resistor and said wiper arm operatively moved with respect to said second resistor being electrically connected together and said second wiper arm operatively moved with respect to first resistor and said wiper arm operatively moved with respect to said third resistor being electrically connected together to produce a non-linear change of output voltage from said network with linear movement of said pick-off along said first resistor.

21. In a control apparatus for a combustion jet propulsion engine having a variable exhaust opening and a fuel control device, first and second motor means for controlling the fuel flow control device, third motor means for controlling the variable exhaust opening, engine temperature responsive means connected in controlling relation to said third motor means, engine speed responsive means for controlling said first motor means to vary the fuel delivery to the engine to respond to the engine speed, and override means including said second motor means and said engine temperature responsive means for reducing the delivery of fuel to the engine when the engine temperature exceeds a predetermined value.

22. In a control apparatus for a combustion jet propulsion engine having a variable exhaust opening and a fuel flow control device, first and second motor means for controlling the fuel flow control device, third motor means for controlling the variable exhaust opening, engine speed responsive means and engine temperature responsive means, one of said responsive means connected in controlling relation to said third motor means, the other of said responsive means for controlling said first motor means to vary the fuel delivery to the engine in response to the signal received by said responsive means, and override means including said second motor means and the responsive means connected in controlling relation to said third motor means for reducing the delivery of fuel to the engine when the signal received by said responsive means exceeds a predetermined value.

23. The combination with a gas turbine engine having an exhaust opening and a fuel system including a fuel control therefor, of a mechanism for varying the effective area of said opening, means for automatically controlling said mechanism, a bridge network comprising apparatus for producing a voltage in the network which reflects a maximum desired engine operating temperature, means for producing a voltage in the network which reflects actual engine temperature, and means connecting said bridge network to said first named means, the apparatus of said bridge network embracing a connection to said fuel control for scheduling fuel to the engine after said maximum engine temperature has been attained.

References Cited in the file of this patent

UNITED STATES PATENTS

| | | |
|---|---|---|
| 2,457,165 | McNamee | Dec. 28, 1948 |
| 2,457,595 | Orr | Dec. 28, 1948 |
| 2,462,925 | Varian | Mar. 1, 1949 |
| 2,463,687 | Gittens | Mar. 8, 1949 |
| 2,487,697 | Conviser | Nov. 8, 1949 |
| 2,513,738 | Noxon | July 4, 1950 |
| 2,514,248 | Lombard et al. | July 4, 1950 |
| 2,516,909 | Redding et al. | Aug. 1, 1950 |
| 2,525,038 | Kutzler | Oct. 10, 1950 |
| 2,525,636 | Bedford et al. | Oct. 10, 1950 |
| 2,590,020 | Kutzler et al. | Mar. 18, 1952 |
| 2,596,815 | Keil | May 13, 1952 |
| 2,597,789 | McGoldrick | May 20, 1952 |
| 2,629,984 | Jamison et al. | Mar. 3, 1953 |
| 2,697,909 | Chandler | Dec. 28, 1954 |
| 2,705,864 | Peters | Apr. 12, 1955 |
| 2,734,340 | Wood | Feb. 14, 1956 |

FOREIGN PATENTS

| | | |
|---|---|---|
| 254,367 | Switzerland | Dec. 16, 1948 |